US012670098B2

(12) United States Patent
Zhang et al.

(10) Patent No.: US 12,670,098 B2
(45) Date of Patent: Jun. 30, 2026

(54) SYSTEMS AND METHODS FOR PREFETCHING DATA VIA A HOST-ACCESSIBLE PREFETCHER QUEUE

(71) Applicant: Samsung Electronics Co., Ltd., Suwon-si (KR)

(72) Inventors: Tong Zhang, Mountain View, CA (US); Zongwang Li, Dublin, CA (US); Da Zhang, Fremont, CA (US); Rekha Pitchumani, Oak Hill, VA (US); Yang Seok Ki, Palo Alto, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/231,122

(22) Filed: Aug. 7, 2023

(65) Prior Publication Data

US 2024/0378153 A1     Nov. 14, 2024

Related U.S. Application Data

(60) Provisional application No. 63/465,494, filed on May 10, 2023.

(51) Int. Cl.
G06F 3/06 (2006.01)
G06F 12/0862 (2016.01)

(52) U.S. Cl.
CPC .. G06F 12/0862 (2013.01); *G06F 2212/6028* (2013.01)

(58) Field of Classification Search
CPC ......... G06F 12/0862; G06F 2212/6028; G06F 3/064; G06F 3/0659; G06F 3/0656;
(Continued)

(56) References Cited

U.S. PATENT DOCUMENTS 6,502,157 B1    12/2002  Batchelor et al.
7,177,985 B1    2/2007   Diefendorff
(Continued)

FOREIGN PATENT DOCUMENTS

WO     WO 2020/172693 A2     8/2020

OTHER PUBLICATIONS

Han, et al. "Command Queue-aware Host I/O Stack for Mobile Flash Storage," Journal of Systems Architecture, 109 (2020), 11 pages.

(Continued)

*Primary Examiner* — Rocio Del Mar Perez-Velez
*Assistant Examiner* — Julian S Mendel
(74) *Attorney, Agent, or Firm* — Womble Bond Dickinson (US) LLP

(57) ABSTRACT

Systems and methods for prefetching data are disclosed. A processor executes a first command for moving first data stored in a storage device. Based on the first command, the processor stores, into a first queue of the storage device, a first address associated with the first data. The storage device further retrieves the first address from the first queue, retrieves the first data from the first storage medium based on the first address, and stores the first data to the second storage medium. In some embodiments, a process for prefetch optimization is also disclosed. A processor identifies a value for prefetching data. The processor runs an application, measures performance of the application, modifies the value based on the performance, and determines that the performance satisfies a criterion.

14 Claims, 11 Drawing Sheets

(58) Field of Classification Search

CPC ......... G06F 12/0875; G06F 2212/1016; G06F 2212/6026; G06F 2212/6022; G06F 2212/602; G06F 2212/6024; G06F 9/3802; G06F 9/30145; G06F 9/30047; G06F 9/3856

See application file for complete search history.

(56) References Cited

U.S. PATENT DOCUMENTS

| | | | |
|---|---|---|---|
| 8,341,352 | B2 | 12/2012 | Cain, III et al. |
| 8,825,724 | B2 | 9/2014 | Mitra et al. |
| 9,418,013 | B2 | 8/2016 | Anantaraman et al. |
| 9,606,926 | B2 | 3/2017 | Garg et al. |
| 10,073,784 | B2 | 9/2018 | Gschwind |
| 10,489,295 | B2 | 11/2019 | Nellans et al. |
| 11,210,225 | B2 | 12/2021 | Bavishi |
| 2004/0003179 | A1* | 1/2004 | Shirahige ............ G06F 12/0862 711/219 |
| 2006/0179238 | A1 | 8/2006 | Griswell, Jr. et al. |
| 2011/0161587 | A1* | 6/2011 | Guthrie .............. G06F 12/0862 711/E12.024 |
| 2016/0154750 | A1* | 6/2016 | Park ........................ G06F 3/061 711/153 |
| 2016/0266792 | A1* | 9/2016 | Amaki .................... G06F 3/064 |
| 2018/0024744 | A1* | 1/2018 | Kim ...................... G06F 3/0688 711/103 |
| 2019/0129854 | A1 | 5/2019 | Jo et al. |
| 2019/0347125 | A1* | 11/2019 | Sankaran .............. G06F 9/3842 |
| 2020/0117462 | A1 | 4/2020 | Jin et al. |
| 2020/0150899 | A1* | 5/2020 | Kim ...................... G06F 3/0679 |
| 2021/0224200 | A1 | 7/2021 | Gupta et al. |
| 2021/0303189 | A1* | 9/2021 | Bae ....................... G06F 3/0679 |
| 2021/0318961 | A1 | 10/2021 | Peterson et al. |
| 2022/0019535 | A1* | 1/2022 | Narsale ............... G06F 12/0862 |
| 2022/0100664 | A1 | 3/2022 | Ahmad et al. |
| 2022/0114098 | A1* | 4/2022 | Das Sharma ....... G06F 13/1668 |
| 2022/0334774 | A1* | 10/2022 | Amaro Ramirez .......................... G06F 12/1009 |
| 2022/0413866 | A1* | 12/2022 | Nathella ............... G06F 9/3818 |
| 2023/0004496 | A1* | 1/2023 | Calciu ................. G06F 12/0862 |
| 2023/0054696 | A1* | 2/2023 | Kappes ................ G06F 9/5011 |
| 2023/0064619 | A1* | 3/2023 | Lim .................... G06F 12/0238 |
| 2023/0267081 | A1* | 8/2023 | Joseph ............... G06F 12/0862 711/118 |
| 2024/0069804 | A1* | 2/2024 | Brewer ................. G06F 3/0622 |
| 2024/0345774 | A1* | 10/2024 | Sano .................... G06F 3/0604 |

OTHER PUBLICATIONS

Lee, et al. "Table-comparison Prefetching in VIA-based Parallel File System," Proceedings of the 2001 IEEE International Conference on Cluster Computing (CLUSTER '01), 5 pages.
European Search Report for EP Application No. 24172374.1 dated Aug. 8, 2024, 15 pages.

* cited by examiner

800

```
void work () {
    Q=MapPrefetcherQueue();
    for (int i=0;i<n;i++) {
        SSD Prefetch(Q,DataBlock[n+1]);
        Compute(DataBlock[n]);
    }
}
```

802

804

806

812

```
void work () {
    Q=MapPrefetcherQueue();
    for (int i=0;i<n;i++) {
        SSD Prefetch(Q,DataBlock[n+X]);
        Compute(DataBlock[n]);
    }
}
```

810

808

```
void work () {
  Q=MapPrefetcherQueue();
  for (int n=0;n<N;n++) {
    SSD Prefetch (Q,DataBlock[n+1]);
    Compute (DataBlock [n]);
  }
}
```

| Iteration | 0 | 1 | 2 | 3 | 4 | 5 | 6 | 7 | 8 |
|---|---|---|---|---|---|---|---|---|---|
| Prefetch Block | 1 | 2 | 3 | 4 | 5 | 6 | 7 | 8 | 9 |
| Prefetched Block | - | - | 1 | 12 | 123 | 1234 | 12345 | 123456 | 1234567 | 123456 |
| Compute Need Block | 0 | 1 | 2 | 3 | 4 | 5 | 6 | 7 | 8 |
| Is Required Block already in Cache? | N | N | N | N | N | N | N | N | N |

SYSTEMS AND METHODS FOR PREFETCHING DATA VIA A HOST-ACCESSIBLE PREFETCHER QUEUE

CROSS-REFERENCE TO RELATED APPLICATION(S)

The present application claims priority to and the benefit of U.S. Provisional Application No. 63/465,494, filed May 10, 2023, entitled "SOFTWARE ASSISTED PREFETCHER FOR DUAL MODE PERSISTENT MEMORY-THROUGH HOST ACCESSIBLE PREFETCHER QUEUE," the entire content of which is incorporated herein by reference.

FIELD

One or more aspects of embodiments according to the present disclosure relate to storage devices, and more particularly to prefetching data stored in a storage device.

BACKGROUND

An application may interact with a storage or memory device (collectively referenced as storage device) for reading (or loading) and writing (or storing) data. Latencies are generally involved in accessing the storage device. The type of latency involved may depend on the storage medium included in the storage device. Certain storage media have lower latencies than other storage media. Thus, it may be desirable to manage the storing of data in the storage device so as to improve overall system performance and responsiveness.

The above information disclosed in this Background section is only for enhancement of understanding of the background of the present disclosure, and therefore, it may contain information that does not form prior art.

SUMMARY

One or more embodiments of the present disclosure are directed to a computing system comprising: a storage device including a first queue, a first storage medium and a second storage medium; a processor configured to communicate with the storage device; and a memory coupled to the processor. The memory stores instructions that, when executed by the processor, cause the processor to: execute a first command for moving first data stored in the storage device; and based on the first command, store, into the first queue, a first address associated with the first data. The storage device is configured to retrieve the first address from the first queue, retrieve the first data from the first storage medium based on the first address, and store the first data to the second storage medium.

According to some embodiments, the instructions further cause the processor to, based on storing the first address in the first queue, modify a pointer identifying a location in the first queue.

According to some embodiments, the first command includes a second command to prefetch data stored in a location associated with the first address.

According to some embodiments, the first storage medium includes non-volatile memory, and the second storage medium includes volatile memory.

According to some embodiments, the first queue is mapped to a user space associated with an application, wherein the first command is executed in the user space.

According to some embodiments, the first command is generated by a first application, wherein the instructions further cause the processor to: execute a second command for moving second data stored in the storage device, wherein the second command is generated by a second application; based on the second command, store, into the first queue, a second address associated with the second data, wherein the storage device is configured to retrieve the second address from the first queue, retrieve the second data from the first storage medium based on the second address, and store the second data to the second storage medium.

According to some embodiments, the first command includes a first call to an operating system, and the second command includes a second call to the operating system, wherein the operating system is configured to manage storing of the first address and the second address into the first queue.

According to some embodiments, the first queue is allocated to the first application, and a second queue is allocated to the second application.

According to some embodiments, the processor is configured to modify a pointer associated with the first queue, based on the storing of the first address into the first queue.

One or more embodiments of the present disclosure are directed to a computing system comprising: a storage device including a first storage medium and a second storage medium; a processor configured to communicate with the storage device; and a memory coupled to the processor, the memory storing instructions that, when executed by the processor, cause the processor to: identify a value for prefetching data; run an application; measure performance of the application; modify the value based on the performance; and determine that the performance satisfies a criterion.

According to some embodiments, the value is a stride of a second memory block to be prefetched, relative to a first memory block used by the application.

According to some embodiments, the value is identified in a prefetch command included in the application.

According to some embodiments, the storage device includes a queue, wherein an address identified based on the value is stored in the queue based on the prefetch command.

According to some embodiments, the storage device is configured to retrieve the address from the queue, retrieve data from the first storage medium based on the address, and store the data to the second storage medium.

According to some embodiments, the application includes a prefetch command identifying the value, wherein the instructions that cause the processor to measure performance include instructions that cause the processor to measure a runtime of the application.

According to some embodiments, the instructions that cause the processor to modify the value include instructions that cause the processor to modify the value randomly.

One or more embodiments of the present disclosure are also directed to a method comprising: executing, by a processor, a first command for moving first data stored in a storage device including a first queue, a first storage medium, and a second storage medium; and based on the first command, storing, by the processor, into the first queue, a first address associated with the first data. The storage device is configured to retrieve the first address from the first queue, retrieve the first data from the first storage medium based on the first address, and store the first data to the second storage medium.

One or more embodiments of the present disclosure are also directed to a method comprising: identifying, by a processor in communication with a storage device, a value for prefetching data; running, by the processor, an application; measuring, by the processor, performance of the application; modifying, by the processor, the value based on the performance; and determining, by the processor, that the performance satisfies a criterion.

These and other features, aspects and advantages of the embodiments of the present disclosure will be more fully understood when considered with respect to the following detailed description, appended claims, and accompanying drawings. Of course, the actual scope of the invention is defined by the appended claims.

BRIEF DESCRIPTION OF THE DRAWINGS

Non-limiting and non-exhaustive embodiments of the present embodiments are described with reference to the following figures, wherein like reference numerals refer to like parts throughout the various views unless otherwise specified.

DETAILED DESCRIPTION

Figure 1:
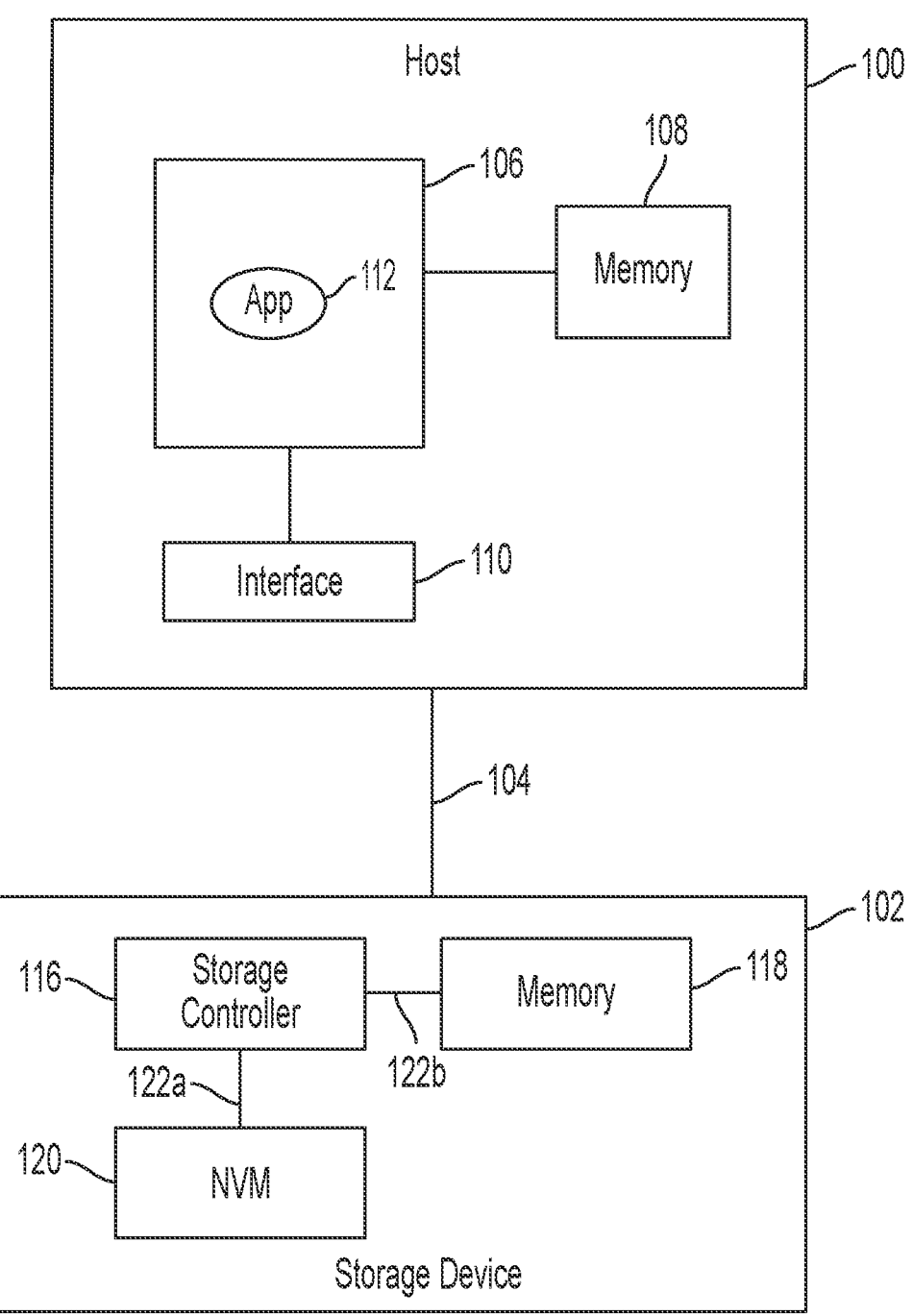
FIG. 1 is a block diagram of a system for prefetching data according to one or more embodiments.

Hereinafter, example embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated. Further, in the drawings, the relative sizes of elements, layers, and regions may be exaggerated and/or simplified for clarity.

Embodiments of the present disclosure are described below with reference to block diagrams and flow diagrams. Thus, it should be understood that each block of the block diagrams and flow diagrams may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (for example the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flow diagrams. Accordingly, the block diagrams and flow diagrams support various combinations of embodiments for performing the specified instructions, operations, or steps.

In general terms an application running on a host computing device (referred to as a "host") may need to store and load data to and from a storage device. Latencies are generally involved in accessing the storage device. The latencies involved may differ depending on the storage medium storing the data that is to be retrieved. For example, the storage device may have both a volatile storage medium (e.g., dynamic random access memory (DRAM)) and a non-volatile storage medium (e.g., NAND flash memory). The latencies of the volatile storage medium may be lower than the latencies of the non-volatile storage medium. It may be desirable to use the volatile storage medium store a block, chunk, or page of data (collectively referred to as a "block") that is anticipated to be accessed by the host in the near future.

In general terms, embodiments of the present disclosure are directed to systems and methods for prefetching data from the NVM of the storage device, to a faster storage medium of the storage device (e.g., DRAM). The faster storage medium may be used as cache memory for the storage device. The prefetching may be via a software prefetch instruction (or command). The prefetch instruction may be manually coded and inserted into a program by a program developer. The prefetch instruction may also be generated and inserted by a compiler into the program, during compilation of the program. In some embodiments, the prefetch instruction may cause data to be loaded into the device cache, prior to the program using the data to perform a computation.

In some embodiments, the storage device includes one or more prefetch request queues that store the memory addresses of the data blocks that are to be prefetched. In some embodiments, the prefetch request queue is mapped to a user space of the host. Exposing the queue to the host may allow an application running in the user space to access the queue to write into it, a memory address that is to be prefetched. The storage device may read the memory address from the queue, and prefetch data identified by the memory address into the storage cache memory. Allowing the application to write into the queue may simplify the design of the storage device.

In some embodiments, the insertion of prefetch addresses into the prefetch request queue is managed by an operating system (OS) kernel of the host. This may be desirable, for example, if two or more applications include prefetch instructions that may cause the two or more applications to access the prefetch request queue (e.g., concurrently).

In some embodiments, contention of the prefetch request queue by the two or more applications may be handled by allowing the OS kernel to manage the queue (e.g., instead of the applications running in the user space). The applications contending for the prefetch request queue may make a call to the OS kernel to process the prefetching of data. In this regard, the OS kernel may serialize the processing of the prefetch instructions from the two or more applications. This may allow the prefetch request queue to be accessed by one application at a time.

As the number of applications grow, maintaining a single prefetch request queue shared by the applications may increase contention for the queue. In some embodiments, the storage system includes two or more prefetch request queues that are allocated to different applications. For example, a first one of the queues may be allocated to a first application, and a second one of the queues may be allocated to a second application. The two or more queues may be exposed to the host, allowing the host to write the addresses of the data to be prefetched, into an appropriate queue based on the requesting application.

In some embodiments, a prefetch instruction included in an application identifies a data block that is to be prefetched. For example, if data needed by the application for a current computation is data block N, the prefetch instruction may be for prefetching a next data block N+1. In some cases, the storage device prefetching the data from the NVM into the device cache may be slow. In such cases, the prefetched data may not be in the device cache before the application is ready to use the data for a computation.

In some embodiments, the systems and methods for prefetching data include software prefetch instructions that are tuned to increase performance of the application that includes the prefetch instructions. The tuning may include the identification of selected prefetch stride (e.g., a distance of the memory block to be prefetched relative to the memory block in current use). As discussed above, due to the latency of the NVM, if the prefetch stride is too near, the application may execute a command to use data that was subject to a prefetch command, prior to completion of the prefetching process.

In some embodiments, the identification of the optimal prefetch stride may be based on an optimization algorithm that measures performance of the application based on different prefetch strides. Performance of the application may include a running or execution time of the application although embodiments are not limited thereto. Another performance parameters may include cache hit or miss ratios, translation lookaside buffer (TLB) hit or miss ratios, branch mispredictions during program execution, and/or the like. Different prefetch strides may be tried until performance of the application satisfies a threshold performance.

FIG. 1 is a block diagram of a system for prefetching data according to one or more embodiments. The system may include a host computing device ("host") 100 coupled to a storage device 102 over one or more data communication links 104. In some embodiments, the data communication links 104 may include various general-purpose interfaces such as, for example, Ethernet, Universal Serial Bus (USB), and/or any wired or wireless data communication link.

The host 100 may include a processor 106, memory 108, and host interface 110. The processor 106 may be configured to run one or more applications or programs (used interchangeably herein) 112 based on instructions stored in the memory 108. The application 112 may be any application configured to transmit requests (e.g., data access requests) to the storage device 102. For example, the application 112 may be a big data analysis application, e-commerce application, database application, machine learning application, and/or the like. Data requests such as, for example, load and store requests, may be generated during the running of the application 112. Results of the data requests may be used by the application to generate an output.

The application 112 may communicate with the storage device 102 via the host interface 110. The host interface 110 may include physical connections as well as software instructions which may be executed by the processor 106. In some embodiments, the host interface 110 allows the host 100 and the storage device 102 to send and receive data using a protocol such as, for example, CXL, although embodiments are not limited thereto. Performance of the application 112 may depend on how fast requested data is retrieved by the storage device 102 and returned to the application 112.

In addition or in lieu of CXL, the host interface 110 may use other protocols such as Cache Coherent Interconnect for Accelerators (CCIX), dual in-line memory module (DIMM) interface, Small Computer System Interface (SCSI), Non Volatile Memory Express (NVMe), Peripheral Component Interconnect Express (PCIe), remote direct memory access (RDMA) over Ethernet, Serial Advanced Technology Attachment (SATA), Fiber Channel, Serial Attached SCSI (SAS), NVMe over Fabric (NVMe-oF), iWARP protocol, InfiniBand protocol, 5G wireless protocol, Wi-Fi protocol, Bluetooth protocol, and/or the like.

The storage device 102 may take the form of a solid state drive (SSD), persistent memory, and/or the like. In some embodiments, the storage device 102 includes (or is embodied as) an SSD with cache coherency and/or computational capabilities. In some embodiments, the storage device 102 includes (or is embodied as) a dual mode persistent memory with dual mode access to its storage space. In a first mode, the storage device 102 is accessible as disk storage (e.g., via CXL.io) at a block level granularity. In a second mode, the storage device 102 is accessible as a device-attached memory (e.g., via CXL.mem or CXL.cache) at a byte level granularity.

In some embodiments, the storage device 102 includes a storage controller 116, storage memory 118, and non-volatile memory (NVM) 120. The storage memory 118 may be high-performing memory of the storage device 102, and may include (or may be) volatile memory, for example, such as DRAM, but the present disclosure is not limited thereto, and the storage memory 118 may be any suitable kind of high-performing volatile or non-volatile memory. Although a single storage memory 118 is depicted for simplicity sake, a person of skill in the art should recognize that the storage device 102 may include other local memory for temporarily storing other data for the storage device.

In some embodiments, the storage memory 118 is used and managed as cache memory. In this regard, the storage memory (also referred to as a cache) 118 may store copies of data stored in the NVM 120. For example, data that is to be accessed by the application 112 in the near future may be copied from the NVM 120 to the storage memory 118 for allowing the data to be retrieved from the storage memory 118 instead of the NVM 120. In some embodiments, the storage memory 118 has a lower access latency than the NVM 120. Thus, in some embodiments, accessing data from the storage memory 118 helps improve overall system performance and responsiveness. Accessing data from the storage memory 118 may also support the second mode of access of the storage device 102 (e.g., byte granularity). For example, the NVM 120 may natively operate in the first access mode (e.g., block granularity). The storage device may nonetheless service a read operation at a byte granularity by doing a block read from the NVM 120 into the storage memory 118 and returning a requested result to host. Similarly, a write operation at a byte level granularity may be buffered in the storage memory 118 until a threshold or condition is met to do a block write to the NVM 120.

The NVM 120 may persistently store data received, for example, from the host 100. The NVM 120 may include, for example, NAND flash memory, but the present disclosure is not limited thereto, and the NVM 120 may include any suitable kind of memory for persistently storing the data according to an implementation of the storage device 102 (e.g., magnetic disks, tape, optical disks, and/or the like).

The storage controller 116 may be connected to the NVM 120 and the storage memory 118 over one or more storage interfaces 122a, 122b (collectively referenced as 122). The storage controller 116 may receive input/output (I/O) requests (e.g. load or store requests) from the host 100, and transmit commands to and from the NVM 120 and/or storage memory 118 for fulfilling the I/O requests. In this regard, the storage controller 116 may include at least one processing component embedded thereon for interfacing with the host 100, the storage memory 118, and the NVM 120. The processing component may include, for example, a digital circuit (e.g., a microcontroller, a microprocessor, a digital signal processor, or a logic device (e.g., a field programmable gate array (FPGA), an application-specific integrated circuit (ASIC), and/or the like)) capable of executing data access instructions (e.g., via firmware and/or software) to provide access to and from the data stored in the storage memory 118 or NVM 120 according to the data access instructions.

In some embodiments, the storage controller 116 includes an interface module for interfacing with the host 100. The interface module may include physical connections as well as software instructions which may be executed by the processing component of the storage controller 116. In some embodiments, the interface module allows the storage device 102 to exchange data with the host 100 using a protocol such as, for example, CXL, CCIX, DIMM, SCSI, NVMe, PCIe, RDMA over Ethernet, SATA, Fiber Channel, SAS, NVMe-oF, iWARP protocol, InfiniBand protocol, 5G wireless protocol, Wi-Fi protocol, Bluetooth protocol, and/or the like.

In some embodiments, the application 112 executed by the processor 106 includes data prefetch instructions that allow the storage controller 116 to prefetch data from the NVM 120 to the storage memory 118. In some embodiments. the prefetch instructions are manually coded and inserted into the application/program 112 by a program developer. In some embodiments, the prefetch instructions are generated and inserted by a compiler into the application/program 112 during compilation of the program. Prefetching of the data may entail, for example, retrieving data from the NVM 120 to the storage memory 118 prior to the application 112 needing the data to perform a computation.

Figure 2:
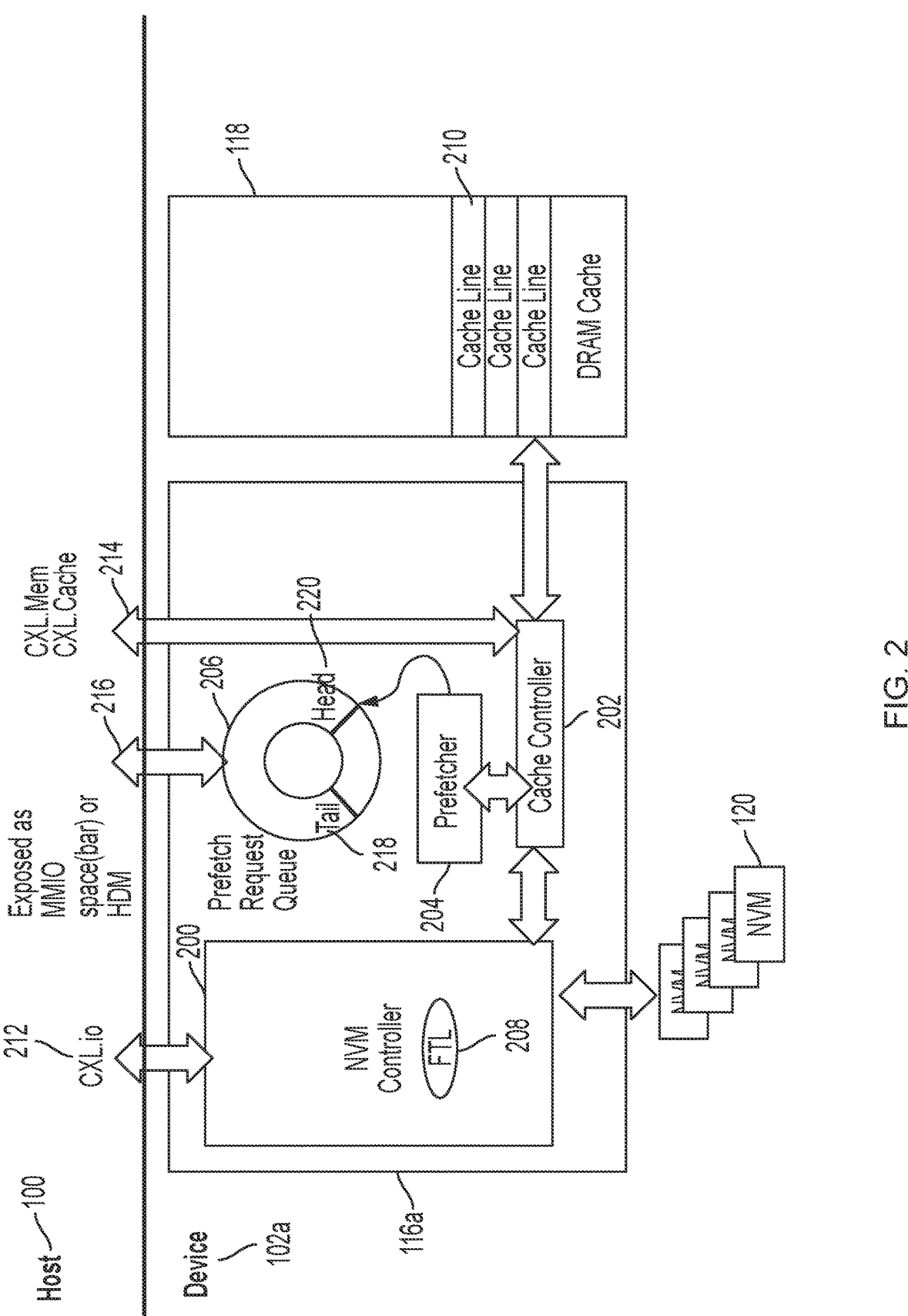
FIG. 2 depicts a block diagram of a storage controller according to one or more embodiments.

FIG. 2 depicts a block diagram of a storage controller 116a according to one or more embodiments. The storage controller 116a includes an NVM controller 200, cache controller 202, storage prefetch engine 204, and prefetch request queue 206. Although the NVM controller 200, cache controller 202, and storage prefetch engine 204 are assumed to be separate components, a person of skill in the art will recognize that one or more of the components may be combined or integrated into a single component, or further subdivided into further sub-components without departing from the spirit and scope of the inventive concept.

In some embodiments, the NVM controller 200, cache controller 202, and/or storage prefetch engine 204 may include, for example, a digital circuit (e.g., a microcontroller, a microprocessor, a digital signal processor, or a logic device (e.g., a field programmable gate array (FPGA), an application-specific integrated circuit (ASIC), and/or the like (collectively referenced as a processor)). The digital circuit may include a memory storing instructions (e.g., software, firmware, and/or hardware code) for being executed by the processor.

In some embodiments, the NVM controller 200 is configured to receive data access requests from the host 100. Using CXL as an example, the data access request may be a disk request based on a CXL.io protocol 212, that allows the NVM 120 to be accessed by the host CPU as disk storage. In some embodiments, the NVM controller 200 includes a flash translation layer (FTL) 208 that receives the data access request and interfaces with the NVM 120 to read data from, and write data to, the NVM. In this regard, the FTL 208 may translate a disk block address included in the data access request, to a flash block address. In doing so, the FTL 208 may engage in wear leveling to move data around the storage cells of the NVM 120 to evenly distribute the writes to the NVM 120.

Referring again to CXL as an example, the data access request may be a memory request based on a CXL.mem or CXL.cache protocol 214, that allows the NVM 120 to be accessed by the host CPU as a device-attached memory.

In some embodiments, the storage prefetch engine 204 is configured to retrieve a memory address from the prefetch request queue 206, where the memory address identifies the data that is to be prefetched from the NVM 200 to the storage memory 118. The memory address may be retrieved from a location of the queue 206 that is marked by a head pointer 220. In some embodiments, the storage prefetch engine 204 communicates with the cache controller 202 for retrieving the data that is stored in the memory address. In this regard, the cache controller 202 may be communicate with the NVM controller 200 for accessing and returning the data from the NVM 120. In this regard, the cache controller 202 or the FTL 208 may be configured to translate a requested memory block address into a flash block address. The NMV controller 200 may retrieve the data from the flash block address, and forward the data to the cache controller 202. The cache controller may select a cache address (e.g., a cache line 210) to store the data, and store the data into cache address.

In some embodiments, the prefetch request queue 206 is stored in the memory 118 of the storage device 102a. In some embodiments, the prefetch request queue 206 is mapped to a user space of the host 100 over a shared address (or memory) interface (or space) 216. For example, the prefetch request queue 206 may be mapped as a memory mapped I/O (MMIO) space. The MMIO may use the same address space for addressing the main memory 108 and the memory of the prefetch request queue 206. The CPU instructions used to access the main memory 108 may be used to access the prefetch request queue 206. In this regard, the storage device 102a may monitor the CPU's address bus and respond to any CPU access of an address assigned to the prefetch request queue 206.

In some embodiments, the prefetch request queue 206 is mapped to the user space as host-managed device memory (HDM). In this regard, the prefetch request queue 206 may be mapped to a system coherent address space that is accessible to the host 100 and the storage device 102a.

In some embodiments, the host 100 accesses the prefetch request queue 206 via the shared address interface 216 to store a memory address of a block to be prefetched by the storage device 102a. The memory address is stored in a location of the prefetch request queue 206 identified based on a tail pointer 218. In some embodiments, the tail pointer 218 is updated by the host 100. In some embodiments, the head pointer 220 is updated by the storage device 102.

Figure 3:
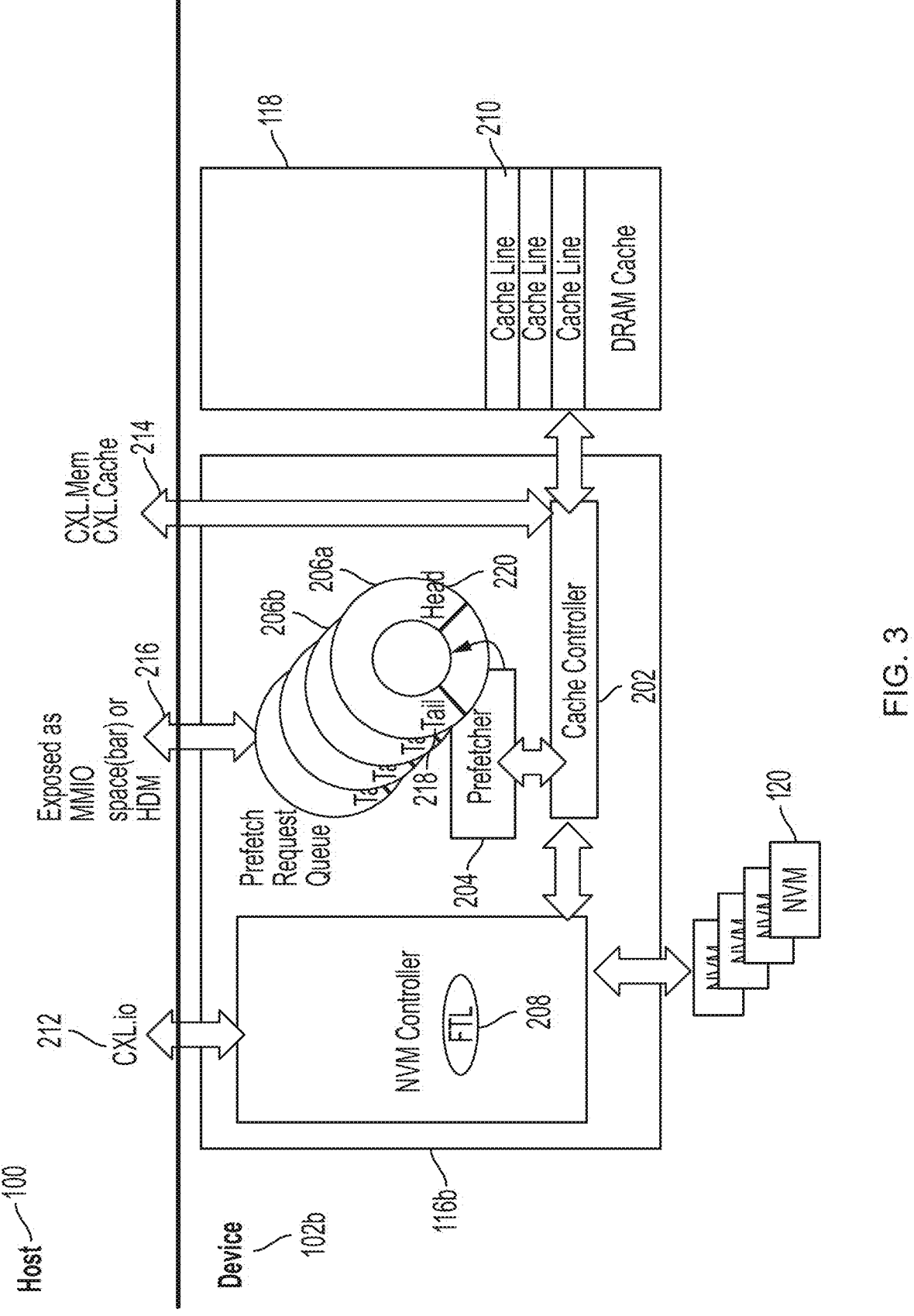
FIG. 3 depicts another block diagram of a storage controller according to one or more embodiments.

FIG. 3 depicts a block diagram of a storage controller 116b according to one or more embodiments. The storage controller 116b of FIG. 3 may be similar to the storage controller 116a of FIG. 2, except that the storage controller 116b of FIG. 3 includes at least a first prefetch request queue 206a and a second prefetch request queue 206b. The first prefetch request queue 206a and the second prefetch request queue 206b may be mapped to the host via the shared address interface 216. In some embodiments, an application 112 may select one of the first prefetch request queue 206a or the second request queue 206b to store an address to be prefetched. The use of multiple queues 206 helps reduce contention in accessing the queues. In some embodiments, the selection of the queue may be by the application 112 or the operation system running on the host 100. The selection may be based on quality of service (QoS) considerations. In some embodiments, the queues 206 are assigned different priorities (e.g., by a system administrator), and an application with a higher priority (also assigned by the system administrator or programmer) is assigned to a higher priority queue for faster processing. In some embodiments, the queues 206 are assigned the same priority.

Figure 4:
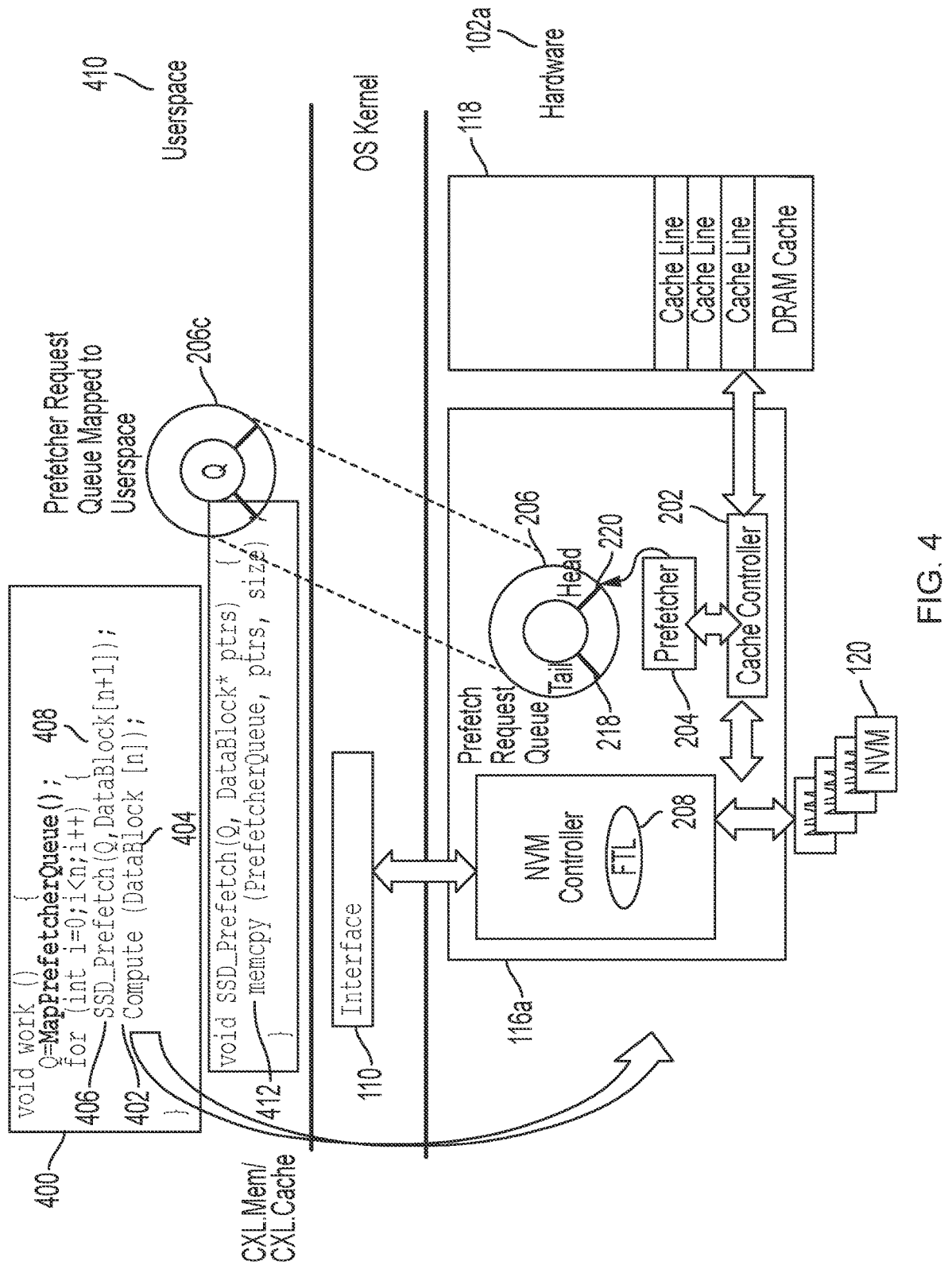
FIG. 4 depicts an example program that may be executed by an application according to one or more embodiments.

FIG. 4 depicts an example program 400 that may be executed by an application 112 according to one or more embodiments. In some embodiments, the program 400 may be for retrieving data from the storage device 102a and performing computations using the retrieved data. The computations may be performed via a compute function 402. The compute function 402 may use a data block N 404. Execution of the compute function 402 may cause the transmitting of a data access request to the data storage device 102 for the data block N 404. The program 400 may need to wait for the data block N 404 to be returned in order to perform the compute function. Thus, performance of the program 400 may depend on the latency of the storage device 102a in returning the requested data block. The latency may be lower if the requested data block is returned from the storage memory 118 (e.g., a cache hit). The latency may be higher if the requested data block is returned from the NVM 120 (e.g., a cache miss).

In order to reduce the memory access latency of the storage device 102a, the program 400 may call a storage prefetch function 406 having a first argument and a second argument, that causes the storage device 102a to prefetch a block of data N+1 408 from the NVM 120 to the storage memory 118, prior the compute function 402 needing the data for performing a computation. In this manner, when a load command for the data block N 404 is received by the storage device 102a when the compute function 402 is called, the requested data block may already be prefetched and reside in the storage device 118, allowing the data to be retrieved and returned from the storage device 118 instead of the NVM 120.

In some embodiments, the storage prefetch function 406 is executed in the user space 410. The storage prefetch function 406 includes a copy command 412 that causes the storing of an address of the data block to be prefetched (referred to as a prefetch address), into the prefetch request queue 206.

In some embodiments, the prefetch request queue 206 is exposed to the user space 410 as a mapped queue 206c. The exposing of the prefetch request queue 206 to the user space may allow the prefetch function 406 to access the queue 206 to store the address. In some embodiments, the copy command 412 in the prefetch function 406 identifies the mapped queue 206c for directing the command to the mapped queue 206c.

In some embodiments, the storage prefetch function 406 identifies a file extent of the data block that is to be prefetched, and translates the file extent into a physical address (e.g., a logical block address (LBA)). The translated physical address may be stored in the prefetch request queue 206 as the prefetch address. In some embodiments, the prefetch address is stored at an end of the queue identified by the tail pointer 218. In some embodiments, the storage prefetch function modifies the tail pointer 218 based on the storing of a new address into the prefetch request queue 206. For example, the end of the queue identified by the tail pointer 218 may be increased by one.

In some embodiments, the head pointer 220 of the prefetch request queue 206 is modified by the storage prefetch manager 204. For example, the storage prefetch manager 204 may increase the head pointer 220 when a prefetch address is retrieved from the prefetch request queue 206, and data stored in the prefetch address is retrieved from the NVM 120 and stored in the storage memory 118.

Figure 5:
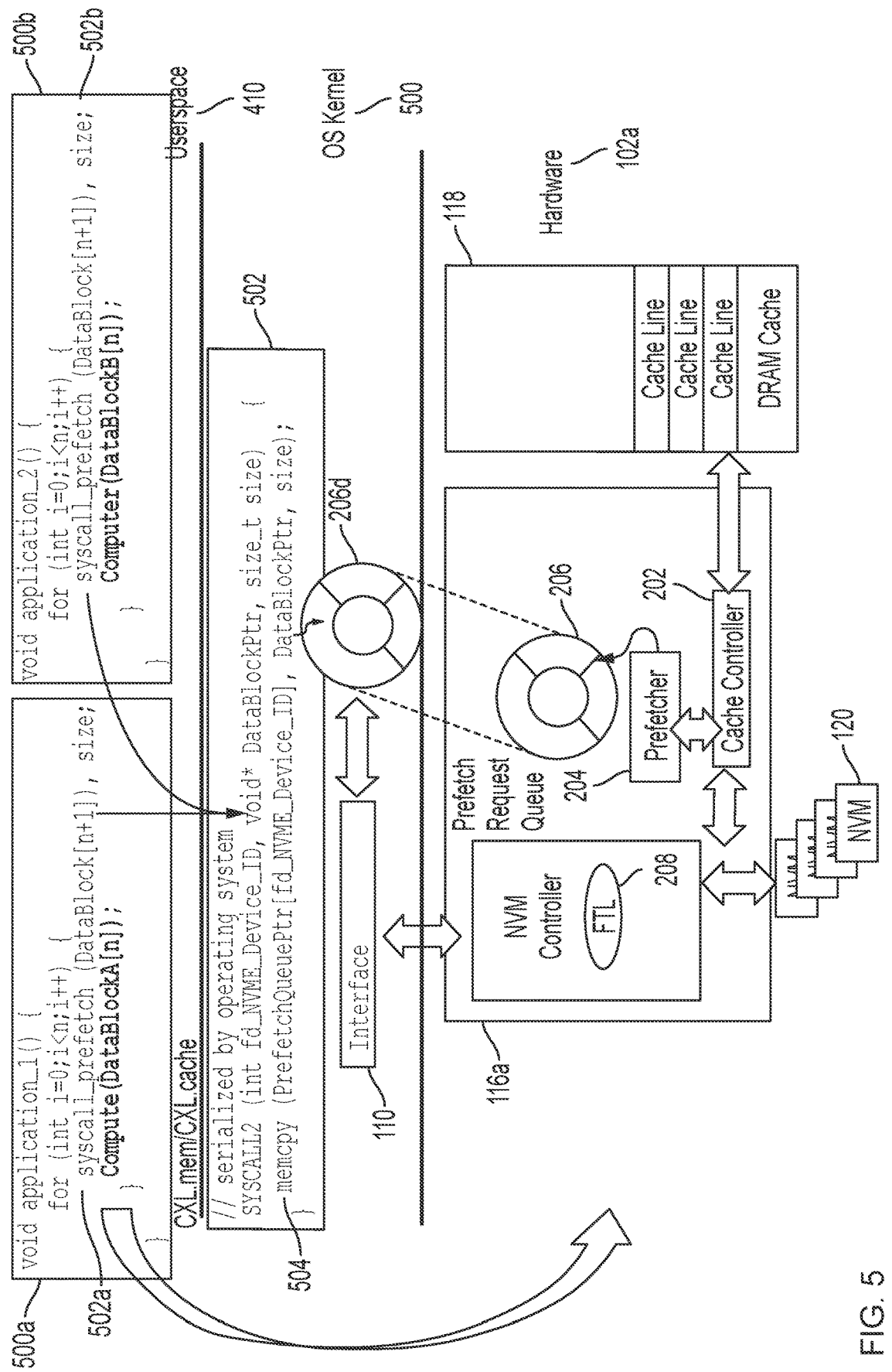
FIG. 5 depicts multiple programs that may contend for a prefetch request queue according to one or more embodiments.

FIG. 5 depicts multiple programs that may contend for the prefetch request queue 206 according to one or more embodiments. For example, a first example program 500a and a second example program 500b may be executed (e.g., concurrently) by the host 100 in the user space 410. The first program 500a and the second program 500b may include respectively a first storage prefetch function 502a and a second storage prefetch function 502b. The first storage prefetch function 502a and the second storage prefetch function 502b may contend for the prefetch request queue 206 for respectively storing a first prefetch address and a second prefetch address into the queue.

In some embodiments, contention for the prefetch request queue 206 may be addressed by handing the management of the queue 206, to the OS kernel 500. In this regard, the prefetch request queue 206 is exposed to the OS kernel 500 as a mapped queue 206d. In some embodiments, the OS kernel 500 executes a system prefetch function 502 that addresses the mapped queue 206d for inserting an address of the data to be prefetched.

In some embodiments, the first and second programs 500a, 500b call the system prefetch function 502a, 502b when prefetching is to be performed. In some embodiments, the OS kernel 500 serializes execution of the system prefetch function for the first and second programs 500a, 500b. This may allow the prefetch request queue 206 to be accessed by one program at a time.

In some embodiments, the system prefetch function 502 issues a copy command 504 for inserting a prefetch address into the queue 206. The inserted prefetch address may be a physical address that may be identified, for example, by the OS kernel 500, based on the memory address identified by the program 500a, 500b. In some embodiments, the OS kernel 500 directs the copy command 504 to the mapped queue 206d for inserting (e.g., serially) the translated physical addresses for the first and second programs 500a, 500b into the queue 206. The queue 206 may thus store the physical addresses to be prefetched for both the first and second programs 500a, 500b.

As the number of applications contending for a single queue 206 increases, serializing access to the single queue 206 may cause undesirable delays in storing prefetch addresses into the queue. Accordingly, in some embodiments, the contention of the prefetch request queue 206 by two or more applications is addressed by providing two or more prefetch request queues in the storage device.

Figure 6:
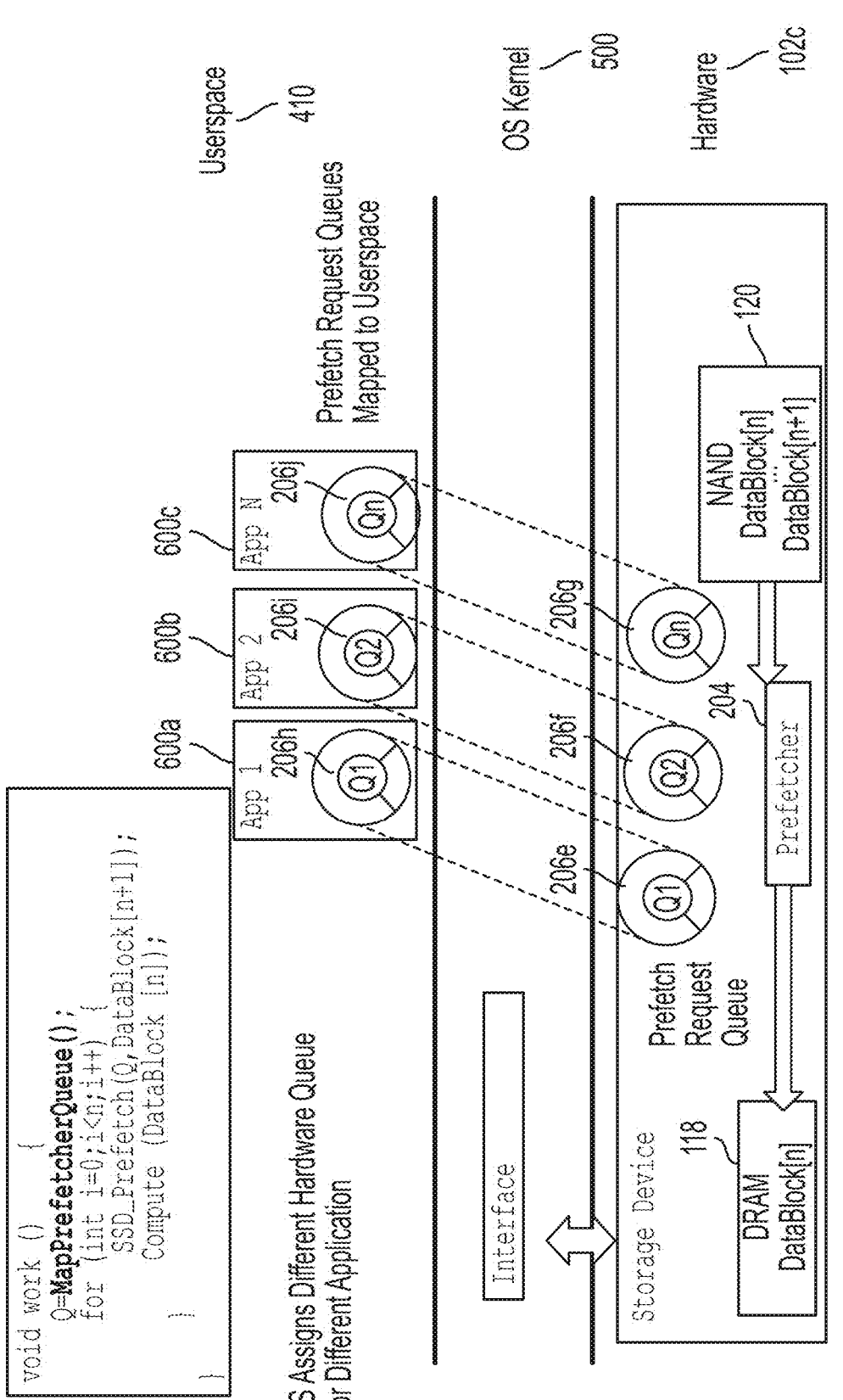
FIG. 6 depicts a storage device that includes two or more prefetch request queues according to one or more embodiments.

FIG. 6 depicts a storage device 102c that includes two or more prefetch request queues 206e-206g according to one or more embodiments. In some embodiments, the prefetch request queues 206e-206g are assigned (e.g., by the operating system) to the applications 600a-600c executed by the host 100. In some embodiments, a first prefetch request queue 206e is assigned to a first application 600a, a second prefetch request queue 206f is assigned to a second application 600b, and a third prefetch request queue 206g is assigned to a third application 600c. The prefetch request queues 206e-206g may be mapped to mapped queues 206h-206j in the user space 410 for access by the corresponding application 600a-600c. The embodiment of FIG. 6 may thus avoid having the OS kernel 500 serialize the access to a single queue.

In some embodiments, the prefetch request queues 206e-206g may be assigned a priority based on, for example, QoS considerations. Example QoS considerations may include, for example, application running time, allocated memory bandwidth, throughput, and/or the like. A programmer or system administrator may assign a QoS level to the queue based on one or more of the QoS considerations. The storage prefetch engine 204 may select the order in which the queues 206e-206g are serviced based on the QoS considerations.

Figure 7:
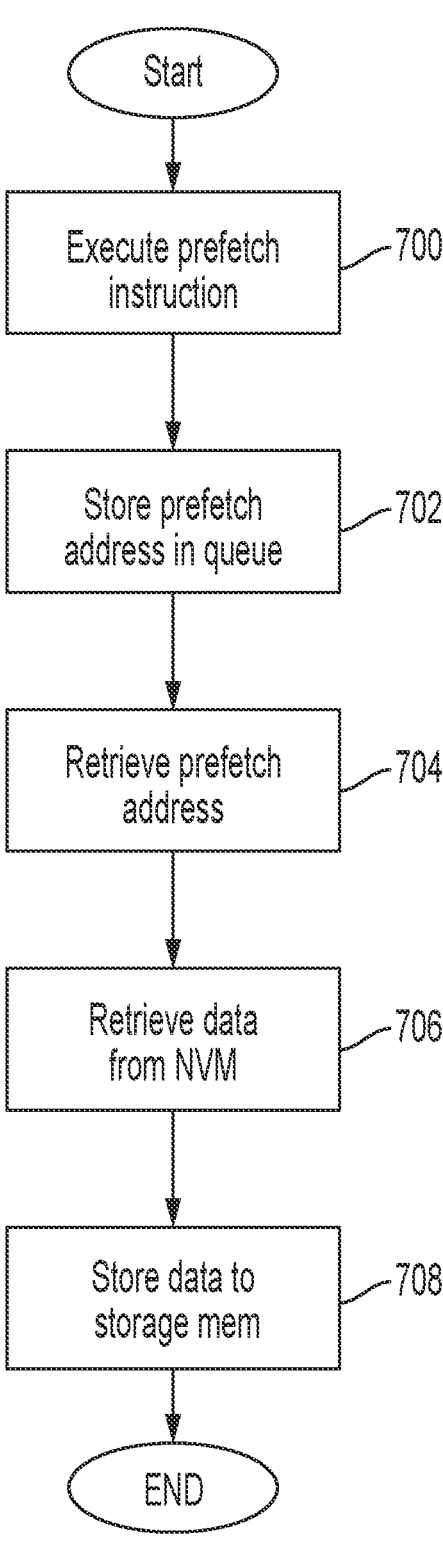
FIG. 7 depicts a flow diagram of a process for prefetching data according to one or more embodiments.

FIG. 7 depicts a flow diagram of a process for prefetching data according to one or more embodiments. The process starts, and in act 700, the processor 106 executes a prefetch instruction (e.g., first command) included in an application. In some embodiments, the prefetch instruction is executed in the user space 410. The prefetch instruction may identify, for example, an address of the data to be prefetched, and an identifier to the prefetch request queue (e.g., mapped queue 206c, 600a-600c) into which a prefetch address (e.g., first address) is to be stored.

In some embodiments, the prefetch instruction includes the address of the data to be prefetched. The identification and management of the prefetch request queue into which the prefetch address is to be stored, is left to the OS kernel 500.

In act 702, the prefetch address is stored into the prefetch request queue 206. The prefetch address may be a physical address that is translated from a logical address provided by the application. In some embodiments, the prefetch instruction invokes a prefetch function in the user space. The prefetch function may include a command for storing the prefetch address in the mapped queue 206c or 206h-206j. In response to the command, the prefetch address may be stored in the prefetch request queue 206 or 206e-206g in the storage device 102.

In some embodiments, the prefetch instruction invokes a storage prefetch function 502 that is executed by the OS kernel 500. The storage prefetch function 502 may manage the storing of the prefetch address into the prefetch request queue (e.g., mapped queue 206d), so that access attempts of the queue by two or more applications is serialized by the OS kernel 500.

In act 704, the storage prefetch engine 204 retrieves and processes the prefetch addresses stored in the prefetch request queue 206 or 206e-206g. In some embodiments, the storage prefetch engine 204 may check the storage memory 118 for determining whether the data to be prefetched already resides in the storage memory 118. The prefetch address may be dropped (and not processed) if the associated data already resides in the storage memory 118.

In act 706, the data identified by the prefetch address is retrieved from the NVM 120. In this regard, the FTL 208 may convert the prefetch address into a location in the NAND where the data is stored.

In act 708, the retrieved data is stored in the storage memory 118. The data may then be available for being retrieved quickly by the application when needed for performing a computation based on the data.

It should be appreciated that the systems and methods for prefetching data that have been described herein provide various advantages, including: 1) they allow the host 100 to access the prefetch request queue to store prefetch addresses into the queue; 2) they help reduce memory access latency (e.g., in the event of a cache hit), and may further improve overall system performance and responsiveness; 3) the existing compiler may be leveraged to insert a prefetch instructions into the program; 4) the use of multiple queues may help reduce contention and improve scalability.

Prefetch Optimization

In some embodiments, the systems and methods for prefetching data include software prefetch instructions that are tuned to maximize performance of an application that includes the prefetch instructions. The tuning may include the identification of an optimal prefetch stride (e.g., a stride of the memory block to be prefetched relative to the memory block in current use). Tuning may help prevent using a prefetch stride that is too close to the memory block in current use.

Figure 8:
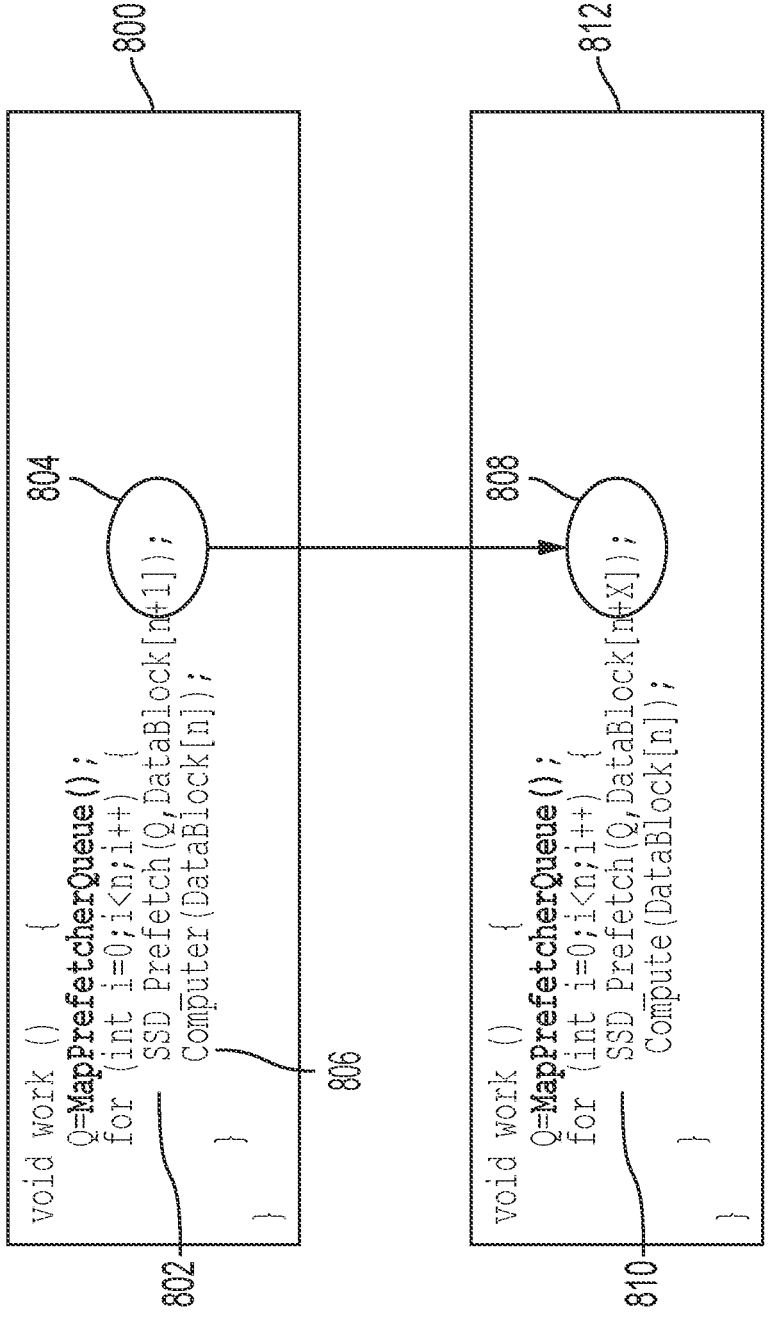
FIG. 8 depicts an example code of a program that includes a call to a storage prefetch function according to one or more embodiments.

FIG. 8 depicts an example code of a program 800 that includes a call to a storage prefetch function 802 that identifies a block of memory to be prefetched, via a prefetch stride value 804 relative to a current block N. In the example code of the program 800, the prefetch stride 804 is "1." Thus, the storage prefetch function 802 causes the prefetching of a next block of data N+1 that is to be used by a compute function 806, while the compute function processes the current block of data N.

In some cases, the prefetching of data from the NVM 120 into the storage memory 118 may be slow. In such cases, the prefetched data may not be in the storage memory 118 before the program is ready to use the data in the compute function 806. Thus, it may be desirable to tune a prefetch stride X 808 identified in a storage prefetch function 810, to have an optimal value to optimize performance of a program 812 that includes the prefetch function.

Figure 9:
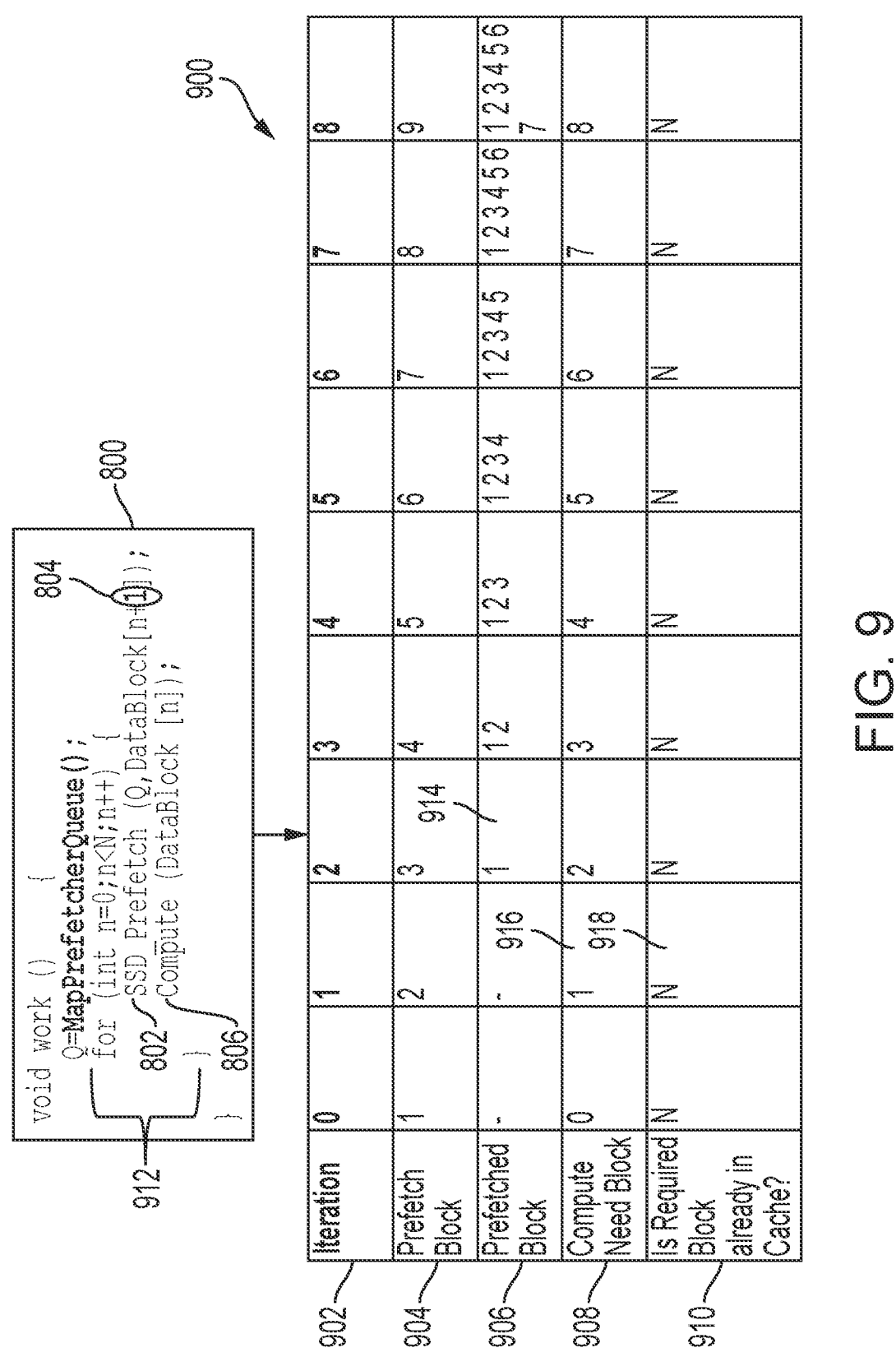
FIG. 9 depicts a table indicating a timing of prefetching of data blocks and a timing of when the data blocks are needed for computation during execution of the example program of FIG. 8, before tuning a prefetch stride according to one or more embodiments.

FIG. 9 depicts a table 900 indicating the timing of the prefetching of data blocks and the timing of when the data blocks are needed for computation during execution of the example program 800 of FIG. 8, before tuning of the prefetch stride 804 according to one or more embodiments. In the example of FIG. 9, it is assumed that the time needed to complete the prefetching data from the NVM 120 to the storage memory 118, is equal to the time needed to execute two iterations of a program loop 912 included in the program 800.

The table 900 may include an iteration number 902 of the loop 912. For one or more of the iteration numbers, the table 900 may also include a corresponding prefetch block 904, a prefetched block 906, a compute need block 908, and an in-cache flag 910. The prefetch block 904 may indicate the block number that is commanded to be prefetched by the storage prefetch function 802 during an iteration of the loop 912. The prefetched block 906 may indicate the block number for which prefetching is completed during the iteration of the loop. The compute need block 908 may indicate the block number that is needed for executing the compute function 806 during the iteration of the loop 912. The in-cache flag may indicate whether the block needed for executing the compute function 806 resides in the storage memory 118 during the iteration of the loop 912.

In the example program 800 of FIG. 9, the prefetch stride is "1." Thus, at iteration 0 of the loop 912 (n=0), the prefetch block 904 that is identified by the storage prefetch function 802 is 1 (n+1=0+1=1). Because it takes two iterations of the loop to complete the prefetching, the prefetching of the data completes in iteration 2, as indicated in the prefetched block portion 914 of the table that corresponds to iteration 2. Thus, data block 1 does not appear in the storage memory 118 until iteration 2.

Data block 1, however, is needed for computation by the compute function 806 in iteration 1 of the loop 912, as indicated in the compute need block portion 916 of the table. Since at iteration 1, the prefetching of block 1 has not yet been completed, it results in a cache miss (e.g., data is not in the storage memory 118). Thus, the in-cache flag 910 is set to "N" 918 for iteration 1.

As shown in the table 900, the example program 800 with a prefetch stride 804 of "1" results in a cache miss for all iterations of the loop 912, due to the access latency of the NVM 120.

Figure 10:
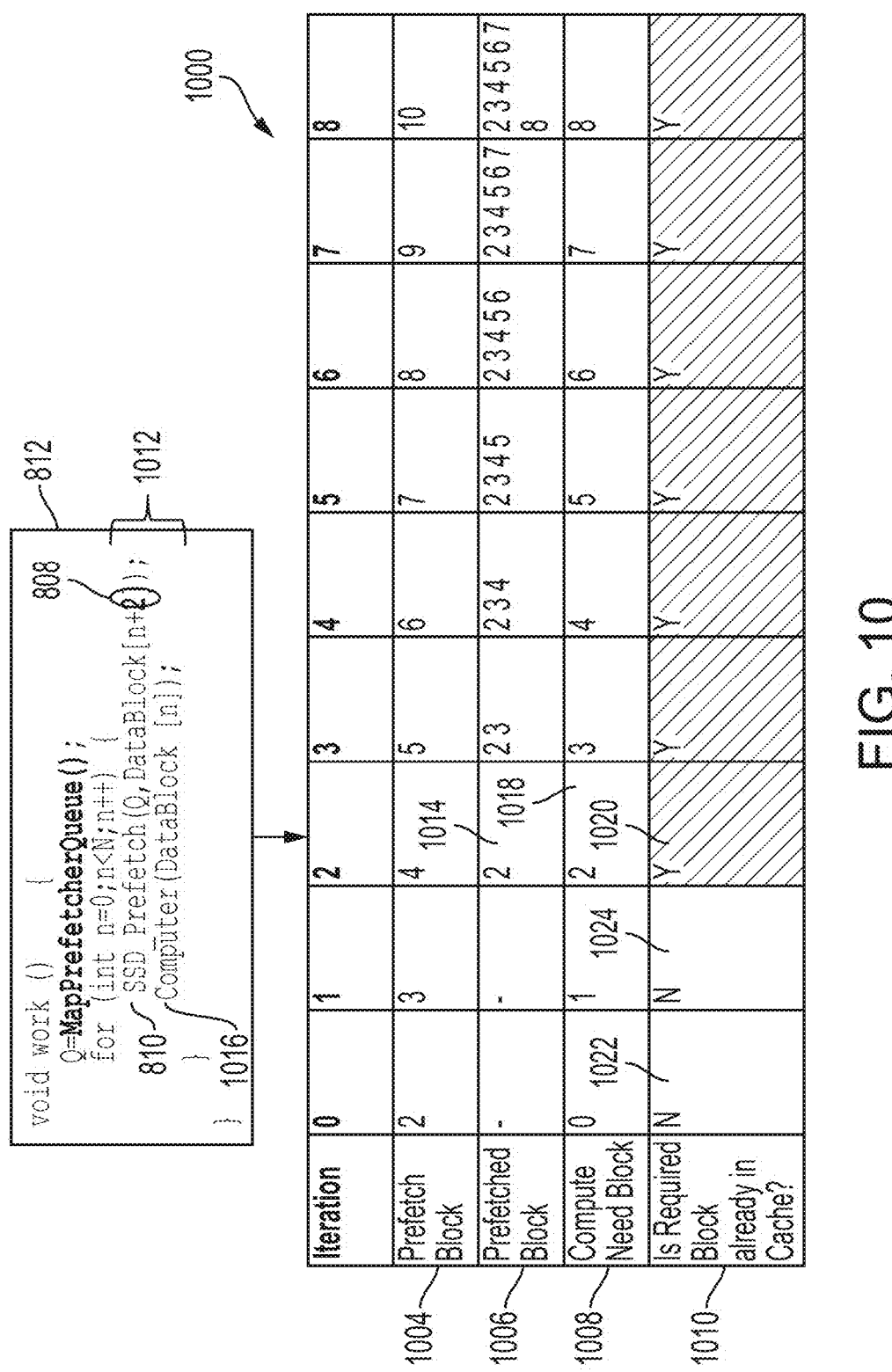
FIG. 10 depicts a table indicating a timing of prefetching of data blocks and a timing of when the data blocks are needed for computation during execution of the example program of FIG. 8, after tuning of the prefetch stride according to one or more embodiments.

FIG. 10 depicts a table 1000 indicating the timing of the prefetching of data blocks and the timing of when the data blocks are needed for computation during execution of the example program 812 of FIG. 8, after tuning of the prefetch stride X 808 to be "2," according to one or more embodiments. It is again assumed that the time needed to complete the prefetching of data from the NVM 120 to the storage memory 118, is equal to the time needed to execute two iterations of a program loop 1012 included in the program 812.

At iteration 0 of the loop 1012 (n=0), the prefetch block 1004 that is identified in the storage prefetch function 810 is 2 (n+2=0+2=2). Because it takes two iterations of the loop to complete the prefetching, the prefetching of the data completes in iteration 2, as indicated in the prefetched block portion 1014 of the table that corresponds to iteration 2. Thus, data block 2 appears in the storage memory 118 starting at iteration 2.

Data block 2 is not needed for computation by a compute function 1016 until iteration 2 of the loop 1012, as indicated in the compute need block portion 1008 of the table. Since at iteration 2, the prefetching of block 2 has already been completed, it results in a cache hit (e.g., data is in the storage memory 118). Thus, the in-cache flag 1010 is set to "Y" 1020 for iteration 2.

As shown in the table 1000, the example program 812 with an optimized prefetch stride 808 of "2" results in a cache hit for all other iterations following iteration 2 of the loop. Iterations 0 and 1, however, result in a cache miss, as indicated by the in-cache flag 101 being set to "N" 1022, 1024, for iterations 0 and 1.

Figure 11:
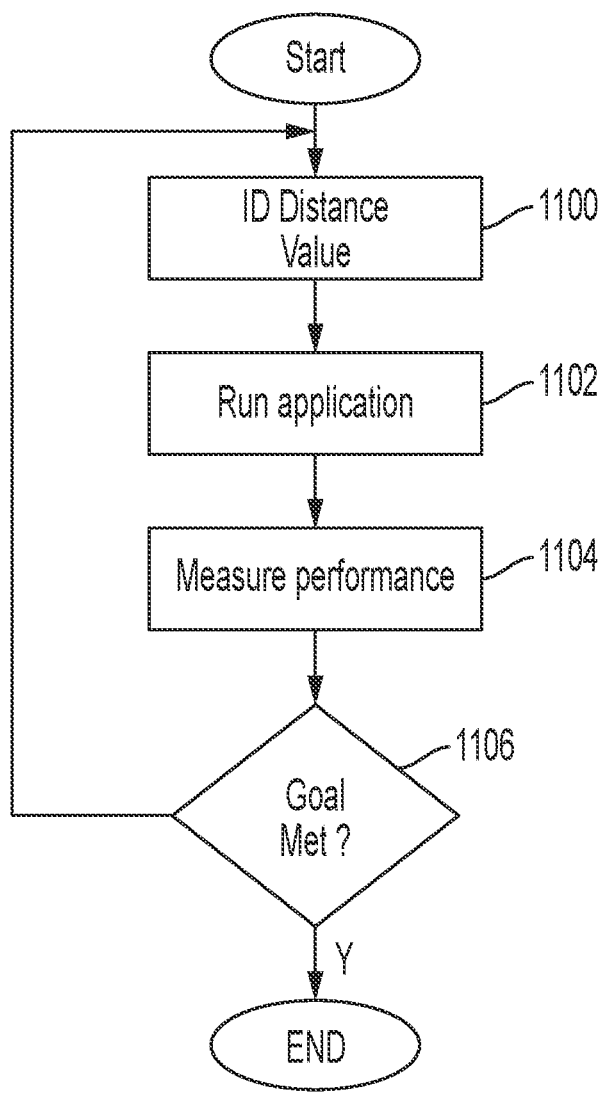
FIG. 11 depicts a flow diagram of a process for prefetch optimization according to one or more embodiments.

FIG. 11 depicts a flow diagram of a process for prefetch optimization according to one or more embodiments. The process may be executed, for example, by the host processor 106 based on instructions that are stored in the memory 108.

The process starts, and in act 1100, a prefetch stride value is identified. In some embodiments, the prefetch stride value is a random number selected within a given constraint (e.g., a minimum and a maximum value), although embodiments are not limited thereto. For example, instead of randomly selecting the prefetch stride value, the value may be selected in a more systematic way. For example, the values may be selected so that they increase (or decrease) in a straight line.

In some embodiments, the selection of the stride value may be based on the application and/or resources. For example, the stride value may be selected based on the data access pattern of the application, and/or properties of the hardware (e.g., memory access latency) used to execute the application. For example, one application with one type of data access pattern may need one stride value, and another application with a different access pattern may need a different stride value. In another example, the stride of an application executed by the CPU may have one stride value and another application executed on the GPU may have another stride value.

In act 1102, the application (e.g., program 800) is compiled and run. The application may be compiled, for example, with feedback directed optimization (FDO).

In act 1104, performance of the application is measured. The performance of the application may be measured by measuring a runtime of the application. In this regard, a start time may be identified when the application starts running, and an end time may be identified when the application finishes running.

In act 1106, a determination is made as to whether a goal has been satisfied. In some embodiments, the goal is deemed satisfied if the performance of the application satisfies a criterion. For example, the performance of the application may satisfy a criterion if the difference between the end time and the start time is below a threshold value.

If the goal has not been satisfied, the process returns to act 1100, and the process repeats with a different stride value. In some embodiments, the FDO is configured to select the new stride value using one of the above methods, and recompile the program based on the measured application performance to achieve better performance.

If the goal is satisfied, the storage prefetch function 810 uses the identified stride value for prefetching data blocks.

In some embodiments, prefetch optimization according to one or more embodiments is performed by a computational storage device (CSD) having an embedded processor and a storage medium. For example, the execution of the application, monitoring of performance of the application, adjustment of the stride value, and/or recompiling of the application based on the adjusted stride value may be performed by the CSD.

One or more embodiments of the present disclosure may be implemented in one or more processors. The term processor may refer to one or more processors and/or one or more processing cores. The one or more processors may be hosted in a single device or distributed over multiple devices (e.g. over a cloud system). A processor may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processor, as used herein, each function is performed either by hardware configured, i.e., hard-wired, to perform that function, or by more general-purpose hardware, such as a CPU, configured to execute instructions stored in a non-transitory storage medium (e.g. memory). A processor may be fabricated on a single printed circuit board (PCB) or distributed over several interconnected PCBs. A processor may contain other processing circuits; for example, a processing circuit may include two processing circuits, an FPGA and a CPU, interconnected on a PCB.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. Also, unless explicitly stated, the embodiments described herein are not mutually exclusive. Aspects of the embodiments described herein may be combined in some implementations.

As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

Although exemplary embodiments of systems and methods for prefetching data have been specifically described and illustrated herein, many modifications and variations will be apparent to those skilled in the art. Accordingly, it is to be understood that systems and methods for prefetching data constructed according to principles of this disclosure may be embodied other than as specifically described herein. The disclosure is also defined in the following claims, and equivalents thereof.

The systems and methods for processing storage transactions may contain one or more combination of features set forth in the below statements.

Statement 1. A computing system comprising: a storage device including a first queue, a first storage medium and a second storage medium; a processor configured to communicate with the storage device; and a memory coupled to the processor, the memory storing instructions that, when executed by the processor, cause the processor to: execute a first command for moving first data stored in the storage device; and based on the first command, store, into the first queue, a first address associated with the first data, wherein the storage device is configured to retrieve the first address from the first queue, retrieve the first data from the first storage medium based on the first address, and store the first data to the second storage medium.

Statement 2. The system of Statement 1, wherein the instructions further cause the processor to: based on storing the first address in the first queue, modify a pointer identifying a location in the first queue.

Statement 3. The system of Statement 1, wherein the first command includes a second command to prefetch data stored in a location associated with the first address.

Statement 4. The system of Statement 1, wherein the first storage medium includes non-volatile memory, and the second storage medium includes volatile memory.

Statement 5. The system of Statement 1, wherein the first queue is mapped to a user space associated with an application, wherein the first command is executed in the user space.

Statement 6. The system of Statement 1, wherein the first command is generated by a first application, wherein the instructions further cause the processor to: execute a second command for moving second data stored in the storage device, wherein the second command is generated by a second application; based on the second command, store, into the first queue, a second address associated with the second data, wherein the storage device is configured to retrieve the second address from the first queue, retrieve the second data from the first storage medium based on the second address, and store the second data to the second storage medium.

Statement 7. The system of Statement 6, wherein the first command includes a first call to an operating system, and the second command includes a second call to the operating system, wherein the operating system is configured to manage storing of the first address and the second address into the first queue.

Statement 8. The system of Statement 6, wherein the first queue is allocated to the first application, and a second queue is allocated to the second application.

Statement 9. The system of Statement 1, wherein the processor is configured to: modify a pointer associated with the first queue, based on the storing of the first address into the first queue.

Statement 10. A computing system comprising: a storage device including a first storage medium and a second storage medium; a processor configured to communicate with the storage device; and a memory coupled to the processor, the memory storing instructions that, when executed by the processor, cause the processor to: identify a value for prefetching data; run an application; measure performance of the application; modify the value based on the performance; and determine that the performance satisfies a criterion.

Statement 11. The system of Statement 10, wherein the value is a stride of a second memory block to be prefetched, relative to a first memory block used by the application.

Statement 12. The system of Statement 10, wherein the value is identified in a prefetch command included in the application.

Statement 13. The system of Statement 12, wherein the storage device includes a queue, wherein an address identified based on the value is stored in the queue based on the prefetch command.

Statement 14. The system of Statement 13, wherein the storage device is configured to retrieve the address from the queue, retrieve data from the first storage medium based on the address, and store the data to the second storage medium.

Statement 15. The system of Statement 10, wherein the application includes a prefetch command identifying the value, wherein the instructions that cause the processor to measure performance include instructions that cause the processor to measure a runtime of the application.

Statement 16. The system of Statement 10, wherein the instructions that cause the processor to modify the value include instructions that cause the processor to: modify the value randomly.

Statement 17. A method comprising: executing, by a processor, a first command for moving first data stored in a storage device including a first queue, a first storage medium, and a second storage medium; and based on the first command, storing, by the processor, into the first queue, a first address associated with the first data, wherein the storage device is configured to retrieve the first address from the first queue, retrieve the first data from the first storage medium based on the first address, and store the first data to the second storage medium.

Statement 18. The method of Statement 17 further comprising: based on storing the first address in the first queue, modifying a pointer identifying a location in the first queue.

Statement 19. The method of Statement 17, wherein the first command includes a second command to prefetch data stored in a location associated with the first address.

Statement 20. The method of Statement 17, wherein the first storage medium includes non-volatile memory, and the second storage medium includes volatile memory.

Statement 21. The method of Statement 17, wherein the first queue is mapped to a user space associated with an application, wherein the first command is executed in the user space.

Statement 22. The method of Statement 17, wherein the first command is generated by a first application, the method further comprising: executing a second command for moving second data stored in the storage device, wherein the second command is generated by a second application; based on the second command, storing, into the first queue, a second address associated with the second data, wherein the storage device is configured to retrieve the second address from the first queue, retrieve the second data from the first storage medium based on the second address, and store the second data to the second storage medium.

Statement 23. The method of Statement 22, wherein the first command includes a first call to an operating system, and the second command includes a second call to the operating system, wherein the operating system is configured to manage storing of the first address and the second address into the first queue.

Statement 24. The method of Statement 22, wherein the first queue is allocated to the first application, and a second queue is allocated to the second application.

Statement 25. The method of Statement 17 further comprising:

modifying a pointer associated with the first queue, based on the storing of the first address into the first queue.

Statement 26. A method comprising: identifying, by a processor in communication with a storage device, a value for prefetching data; running, by the processor, an application; measuring, by the processor, performance of the application; modifying, by the processor, the value based on the performance; and determining, by the processor, that the performance satisfies a criterion.

Statement 27. The method of Statement 26, wherein the value is a stride of a second memory block to be prefetched, relative to a first memory block used by the application.

Statement 28. The method of Statement 26, wherein the value is identified in a prefetch command included in the application.

Statement 29. The method of Statement 28, wherein the storage device includes a queue, wherein an address identified based on the value is stored in the queue based on the prefetch command.

Statement 30. The method of Statement 29, wherein the storage device is configured to retrieve the address from the queue, retrieve data from a first storage medium of the storage device based on the address, and store the data to a second storage medium of the storage device.

Statement 31. The method of Statement 26, wherein the application includes a prefetch command identifying the value, wherein the measuring of the performance includes measuring a runtime of the application.

Statement 32. The method of Statement 26, wherein the modifying the value includes modifying the value randomly.

What is claimed is:

1. A computing system comprising:

a storage device including a first queue, a first storage medium, and a second storage medium;

a processor configured to communicate with the storage device; and a memory coupled to the processor, the memory storing instructions that, when executed by the processor, cause the processor to:

map the first queue onto an address space of the memory for generating a mapped queue;

identify a program including a first function call and a second function call, the first function call having as a first argument, a reference to the mapped queue, and as a second argument, a reference to first data;

execute the first function call, wherein the executing of the first function call causes the processor to execute instructions of the first function call based on the first argument and the second argument to access the mapped queue and store, into the mapped queue, a first address associated with the first data, wherein the storage device is configured to retrieve the first address from the first queue, retrieve the first data from the first storage medium based on the first address, and store the first data to the second storage medium; and execute the second function call, wherein the executing of the second function call causes the processor to transmit a request to the storage device to retrieve the first data from the second storage medium.

2. The system of claim 1, wherein the instructions further cause the processor to:

based on storing the first address in the first queue, modify a pointer identifying a location in the first queue.

3. The system of claim 1, wherein the first function call is to prefetch data stored in a location associated with the first address.

4. The system of claim 1, wherein the first storage medium includes non-volatile memory, and the second storage medium includes volatile memory.

5. The system of claim 1, wherein the first queue is mapped to a user space associated with an application, wherein the first function call is executed in the user space.

6. The system of claim 1, wherein the first function call is generated by a first application associated with the program, wherein the instructions further cause the processor to:

execute a third function call for moving second data stored in the storage device, wherein the third function call is generated by a second application;

based on the third function call, store, into the first queue, a second address associated with the second data, wherein the storage device is configured to retrieve the second address from the first queue, retrieve the second data from the first storage medium based on the second address, and store the second data to the second storage medium.

7. The system of claim 6, wherein the first function call includes a first call to an operating system, and the third function call includes a second call to the operating system, wherein the operating system is configured to manage storing of the first address and the second address into the first queue.

8. The system of claim 6, wherein the first queue is allocated to the first application, and a second queue is allocated to the second application.

9. The system of claim 1, wherein the processor is configured to:

modify a pointer associated with the first queue, based on storing of the first address into the first queue.

10. The computer system of claim 1, wherein the instructions that cause the processor to execute instructions of the first function call include instructions that cause the processor to:

execute a copy command identifying the mapped queue as a destination for copying the first data.

11. A method comprising:

mapping, by a processor of a computing system having a memory coupled to the processor, a first queue onto an address space of the memory for generating a mapped queue, wherein the first queue is included in a storage device having a first storage medium and a second storage medium;

identifying, by the processor, a program including a first function call and a second function call, the first function call having as a first argument, a reference to the mapped queue, and as a second argument, a reference to first data;

executing, by the processor, instructions of the first function call based on the first argument and the second argument for accessing the mapped queue; and storing, into the mapped queue, a first address associated with the first data, wherein the storage device is configured to retrieve the first address from the first queue, retrieve the first data from the first storage medium based on the first address, and store the first data to the second storage medium; and executing, by the processor, the second function call, wherein the executing of the second function call includes transmitting, by the processor, a request to the storage device to retrieve the first data from the second storage medium.

12. The method of claim 11 further comprising:

based on storing the first address in the first queue, modifying a pointer identifying a location in the first queue.

13. The method of claim 11, wherein the first function call includes a command to prefetch data stored in a location associated with the first address.

14. The method of claim 11, wherein the first storage medium includes non-volatile memory, and the second storage medium includes volatile memory.

* * * * *